US008085128B2

(12) United States Patent
Colley, III

(10) Patent No.: US 8,085,128 B2
(45) Date of Patent: Dec. 27, 2011

(54) DRAWER CONTROL APPARATUS

(75) Inventor: William C. Colley, III, Oberlin, OH (US)

(73) Assignee: MV Circuit Design Inc., Vermilion, OH (US)

( * ) Notice: Subject to any disclaimer, the term of this patent is extended or adjusted under 35 U.S.C. 154(b) by 751 days.

(21) Appl. No.: 12/212,763

(22) Filed: Sep. 18, 2008

(65) Prior Publication Data

US 2009/0212907 A1 Aug. 27, 2009

Related U.S. Application Data

(60) Provisional application No. 61/030,318, filed on Feb. 21, 2008.

(51) Int. Cl.
*B60R 25/00* (2006.01)

(52) U.S. Cl. ...... 340/5.7; 340/5.54; 340/5.71; 340/5.73; 70/264; 70/278.1; 49/16

(58) Field of Classification Search ................. 340/5.54, 340/5.7, 5.71, 5.73; 70/264, 278.1; 49/16
See application file for complete search history.

(56) References Cited

U.S. PATENT DOCUMENTS

| | | | | | |
|---|---|---|---|---|---|
| 2,765,648 | A | * | 10/1956 | Hatcher | 70/264 |
| 3,913,263 | A | * | 10/1975 | Butt | 49/16 |
| 4,232,354 | A | * | 11/1980 | Mueller et al. | 340/5.54 |
| 5,745,366 | A | | 4/1998 | Higham et al. | |
| 5,805,456 | A | | 9/1998 | Higham et al. | |
| 5,883,806 | A | | 3/1999 | Meador et al. | |
| 5,905,653 | A | | 5/1999 | Higham et al. | |
| 5,941,106 | A | * | 8/1999 | Williamson et al. | 70/278.1 |
| 6,011,999 | A | | 1/2000 | Holmes | |
| 6,609,047 | B1 | | 8/2003 | Lipps | |
| 7,263,410 | B1 | | 8/2007 | Frederick et al. | |

* cited by examiner

*Primary Examiner* — George Bugg
*Assistant Examiner* — Sisay Yacob
(74) *Attorney, Agent, or Firm* — Renner, Otto, Boisselle & Sklar, LLP

(57) ABSTRACT

A device for selectively controlling access to a plurality of secure areas includes a driver circuit including a plurality of drivers, and a plurality of access modules each assigned to a corresponding secure area of the plurality of secure areas. Each access module is operatively coupled to at least one actuator operative to grant or deny access to the corresponding secure area. Unused drivers provided to a first access module of the plurality of access modules are cascaded to a second access module of the plurality of access modules.

19 Claims, 4 Drawing Sheets

DRAWER CONTROL APPARATUS

RELATED APPLICATION DATA

This application claims priority of U.S. Provisional Application No. 61/030,318 filed on Feb. 21, 2008, which is incorporated herein by reference in its entirety.

TECHNICAL FIELD OF THE INVENTION

The present invention relates to a method, apparatus and system for selectively controlling access to a secure area, such as one or more lockable drawers.

DESCRIPTION OF THE RELATED ART

In healthcare facilities, e.g., hospitals, medical products prescribed to patients may be temporarily stored in medication-dispensing units. Typically, a healthcare facility has one or more medication-dispensing units located on each floor and/or nursing station of the healthcare facility for storing medical products prescribed to patients on that floor. Each of the medication-dispensing units may include lockable storage compartments to limit access of the medical products contained therein to authorized healthcare workers. Controlled substances, such as morphine, may be segregated into individual storage compartments in a medication-dispensing unit to control access to these substances.

A healthcare worker, e.g., nurse, may log onto a medication-dispensing unit before administering medical products to patients. In order to authenticate the healthcare worker logging on, the dispensing unit may require him/her to scan an identification badge. Alternatively, the healthcare worker may gain access to the medical products in the dispensing unit with an electronic or manual key. Once logged on or otherwise granted access to the dispensing unit, the healthcare worker may pull up a list of patients assigned to him/her, including the medical products to be administered to the respective patients. The healthcare worker then may remove the medical products identified in the list of patients from the dispensing unit. In a further alternative, the dispensing unit may automatically grant the healthcare worker access to one or more individual storage compartments including medical products.

SUMMARY

A system for granting or inhibiting access to one or more secure areas, such as drawers of a medical dispensing unit, includes one or more access modules. Each access module includes a circuit for locking (inhibiting access) and unlocking (granting access) the corresponding secure area, as well as detecting when the secure area is open, closed, or present. The circuit can include, for example, actuators, switches, etc. corresponding to each secure area. Typically, the access modules are stacked one on top of the other, wherein electrical connections from a first module are provided to a second module, and so on. The system further includes a control module operatively coupled to each circuit of the one or more access modules. The control module receives data signals from the access module circuit and provides control signals to the access module circuit so as to control and/or monitor access to the one or more secure areas (e.g., the control module provides control signals to the actuators based on data obtained from the switches and/or other security related data).

The system and/or control module includes a control circuit for controlling a plurality of access modules. The circuit enables physically identical access modules to selectively control access to different secure areas with little or no setup to distinguish between access modules. Further, the circuit enables a signal polarity applied to an actuator utilized in the system (e.g., a solenoid) to be reversed as required.

According to one aspect of the invention, a system for selectively controlling access to a plurality of secure areas includes: a plurality of actuators each operative to grant or deny access to a corresponding one of the plurality of secure areas; a plurality of access modules each assigned to at least one secure area of the plurality of secure areas; a driver circuit including a plurality of drivers for driving a load, wherein at least one of the plurality of drivers is operatively coupled to an actuator corresponding to an access module's secure area, and wherein unused drivers provided to a first access module of the plurality of access modules are output in a cascaded configuration to a second access module of the plurality of access modules According to one aspect of the invention, each actuator of the plurality of actuators is operatively coupled to two drivers of the plurality of drivers.

According to one aspect of the invention, a first driver of the plurality of drivers is operatively coupled to a first terminal of a plurality of actuators, and a second driver of the plurality of drivers is operatively coupled to a second terminal of only one actuator of the plurality of actuators.

According to one aspect of the invention, the driver circuit is operative to reverse polarity of a signal provided to an actuator of the plurality of actuators.

According to one aspect of the invention, at least one driver of the plurality of drivers is operative to be driven high, low or off.

According to one aspect of the invention, a single driver of the plurality of drivers is operatively coupled to a first terminal of each of the plurality of actuators.

According to one aspect of the invention, a single driver of the plurality of drivers is operatively coupled to a second terminal of one of the plurality of actuators.

According to one aspect of the invention, the system is a medication dispensing unit.

According to one aspect of the invention, the system further includes a control module operatively coupled to the driver circuit, said control module configured to operate the plurality of drivers so as to selectively control access to the plurality of secure areas.

According to one aspect of the invention, at least one access module of the plurality of access modules is operative to detect a state of the corresponding secure area.

According to one aspect of the invention, the possible states of the secure areas are open, closed, present or locked.

According to one aspect of the invention, the system further includes a plurality of switches each corresponding to one of the plurality of secure areas, each switch operative to provide information corresponding to a state of the respective secure area.

According to one aspect of the invention, the system further includes an input circuit operatively coupled to each of the plurality of access modules, said input circuit including i) a plurality of pull-up drivers operatively coupled to a first terminal of only one of the plurality of switches, and ii) a common input for coupling to a second terminal of each of the plurality of switches, wherein each access module is configured such that unused pull-up drivers provided to a first access module of the plurality of access modules are cascaded to a second access module of the plurality of access modules.

According to one aspect of the invention, the plurality of access modules are physically identical to one another.

According to one aspect of the invention, the system further includes a plurality of locking mechanisms, wherein each of the plurality of locking mechanisms is operatively coupled to a corresponding one of the plurality of actuators.

According to one aspect of the invention, a system for selectively controlling access to a plurality of secure areas includes: a plurality of loads each corresponding to a state of access to a corresponding one of the plurality of secure areas; a plurality of access modules each assigned to at least one secure area of the plurality of secure areas; and a driver circuit including a plurality of drivers, wherein at least one of the plurality of drivers is operatively coupled to an actuator corresponding to an access module's secure area, and wherein unused drivers provided to a first access module of the plurality of access modules are output in a cascaded configuration to a second access module of the plurality of access modules.

According to one aspect of the invention, the load is an actuator or a status indicator.

According to one aspect of the invention, an access module for use in a system for selectively controlling access to a plurality of secure areas, said system including a) a plurality of loads each corresponding to a state of access to a corresponding one of the plurality of secure areas, and b) a driver circuit including a plurality of drivers, wherein the access module corresponds to at least one secure area of the plurality of secure areas, the access module including: a plurality of inputs configured to receive signals from the plurality of driver circuits; a first plurality of outputs operatively coupled to at least some of the plurality of inputs, wherein the first plurality of outputs are configured to communicate the signals to actuators corresponding to the access module's secure area; and a second plurality of outputs operatively coupled to others of the plurality of inputs, wherein the second plurality of outputs provide a cascaded output of the others of the plurality of inputs.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Figure 1:
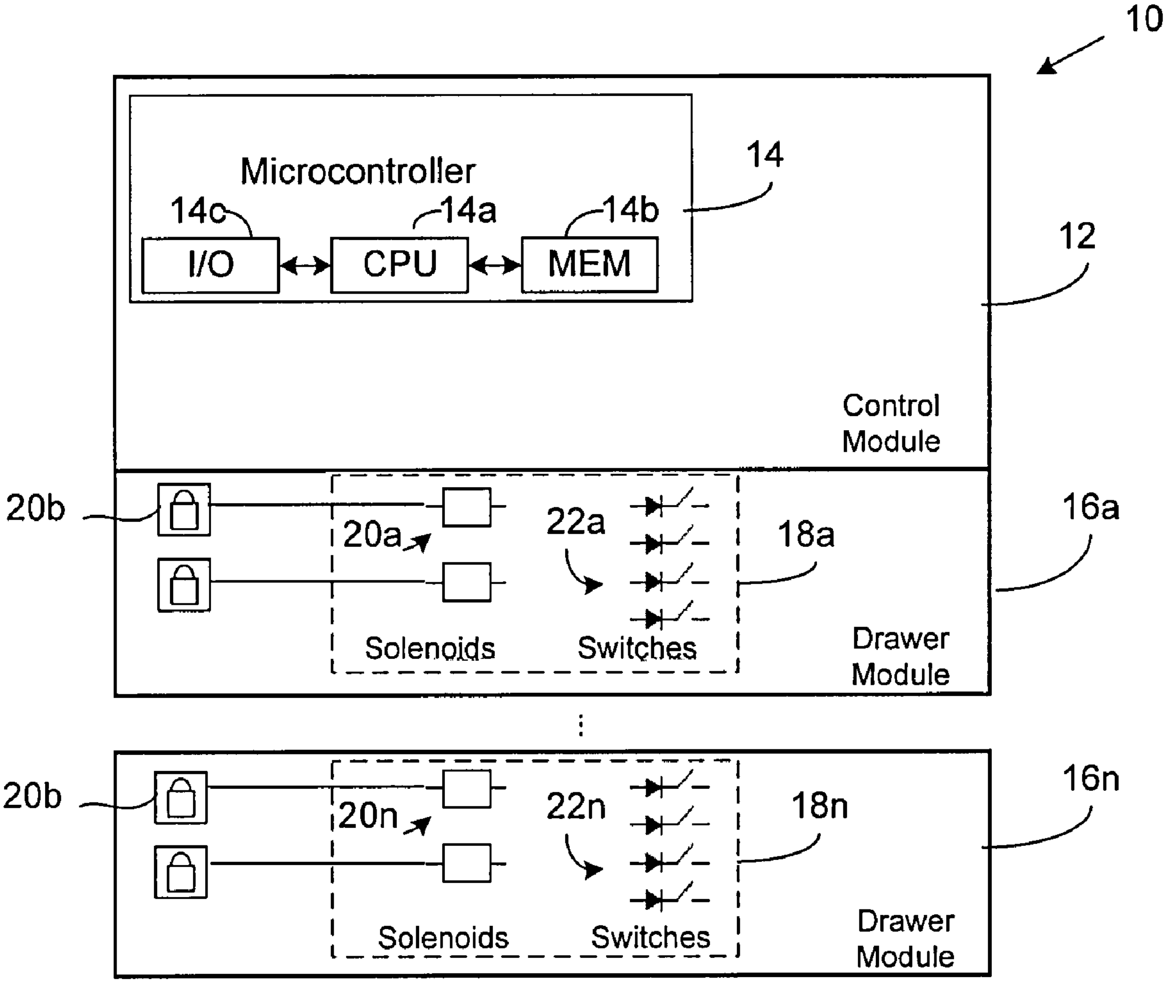
FIG. 1 is a schematic diagram of an exemplary drawer system.

Embodiments of the present invention will now be described with reference to the drawings, wherein like reference numerals are used to refer to like elements throughout. It will be understood that the figures are not necessarily to scale.

In the present application, embodiments of the invention are described primarily in the context of a medical dispensing system. However, it will be appreciated that the invention is not intended to be limited to a medical dispensing system and may relate to any type of security system in which access to a particular area is to be monitored and/or restricted.

Referring to FIG. 1, there is shown an exemplary drawer system 10 for dispensing medications in a hospital environment. The drawer system 10 includes a control module 12 for monitoring and controlling operation of the drawer system 10. The control module 12 includes a microcontroller 14, which can include a processor 14*a*, memory 14*b*, and input/output (I/O) module 14*c*. The memory 14*b* can include both volatile memory and non-volatile memory as is conventional. Stored in memory 14*b* is logic that when executed by the processor 14*a* causes the I/O module 14*c* to provide commands to a drawer module (discussed below) that grant or deny access to drawers of the drawer system 10.

With continued reference to FIG. 1, the drawer system 10 also includes one or more drawer modules 16*a*-16*n* (also referred to as access modules). Each drawer module 16*a*-16*n* includes a corresponding circuit 18*a*-18*n* configured to interface with a corresponding drawer (not shown) of the drawer system 10. The circuits 18*a*-18*n* can include one or more actuators 20$a_i$-20$n_i$ (e.g., solenoids, etc.) corresponding to the drawer and operative to grant or deny access to the drawer, and one or more switches 22$a_i$-22$n_i$ (e.g., electromechanical or optical switches) for detecting a state (e.g., open, closed, present, locked, etc.) of the corresponding drawer. As used herein, the "open state" refers to a drawer that is not completely closed, "closed state" refers to a drawer that is not open (including not partially open), "present state" refers to a drawer being physically present in the system, and "locked state" refers to a drawer that is in the "closed state" and unable to be opened. Each actuator 20$a_i$-20$n_i$ is operatively coupled to a locking mechanism 20*b* corresponding to each drawer, wherein the locking mechanism can lock the drawer in the closed position (i.e., deny access to the drawer) or unlock the drawer (i.e., grant access to the drawer). The locking mechanism may be any conventional locking mechanism known in the art. Further, each switch 22$a_i$-22$n_i$ is operatively coupled to a corresponding drawer or drawer receptacle (which contains the drawer) so as to detect when the drawer is open, closed, or present. The actuators 20$a_i$-20$n_i$ and switches 22$a_i$-22$n_i$ of the circuits 18*a*-18*n* are operatively coupled to the control module 12 via the I/O module 14*c* so as to enable the control module 12 to lock or unlock drawers and to detect the state of the drawers.

In operation, the control module 12, based on certain criteria (e.g., authorized identification such as a password or identification badge), may unlock a drawer so that it may be opened. This can be accomplished, for example, by the control module 12 commanding the actuator corresponding to the drawer in which access will be granted to enable or disable the corresponding locking mechanism. For example, when an unlock command is provided to the actuator 20$a_i$, the actuator can act on the locking mechanism corresponding to the drawer so as to disable the lock, thereby enabling the drawer to be opened. Additionally, the control module 12 can monitor the state of the switches 20$a_i$ so as to determine a state of the corresponding drawer. This can be used, for example, to ensure only one drawer is unlocked at a particular moment in time (e.g., if a drawer is opened, another drawer will not be unlocked until all drawers are first closed).

Figure 2:
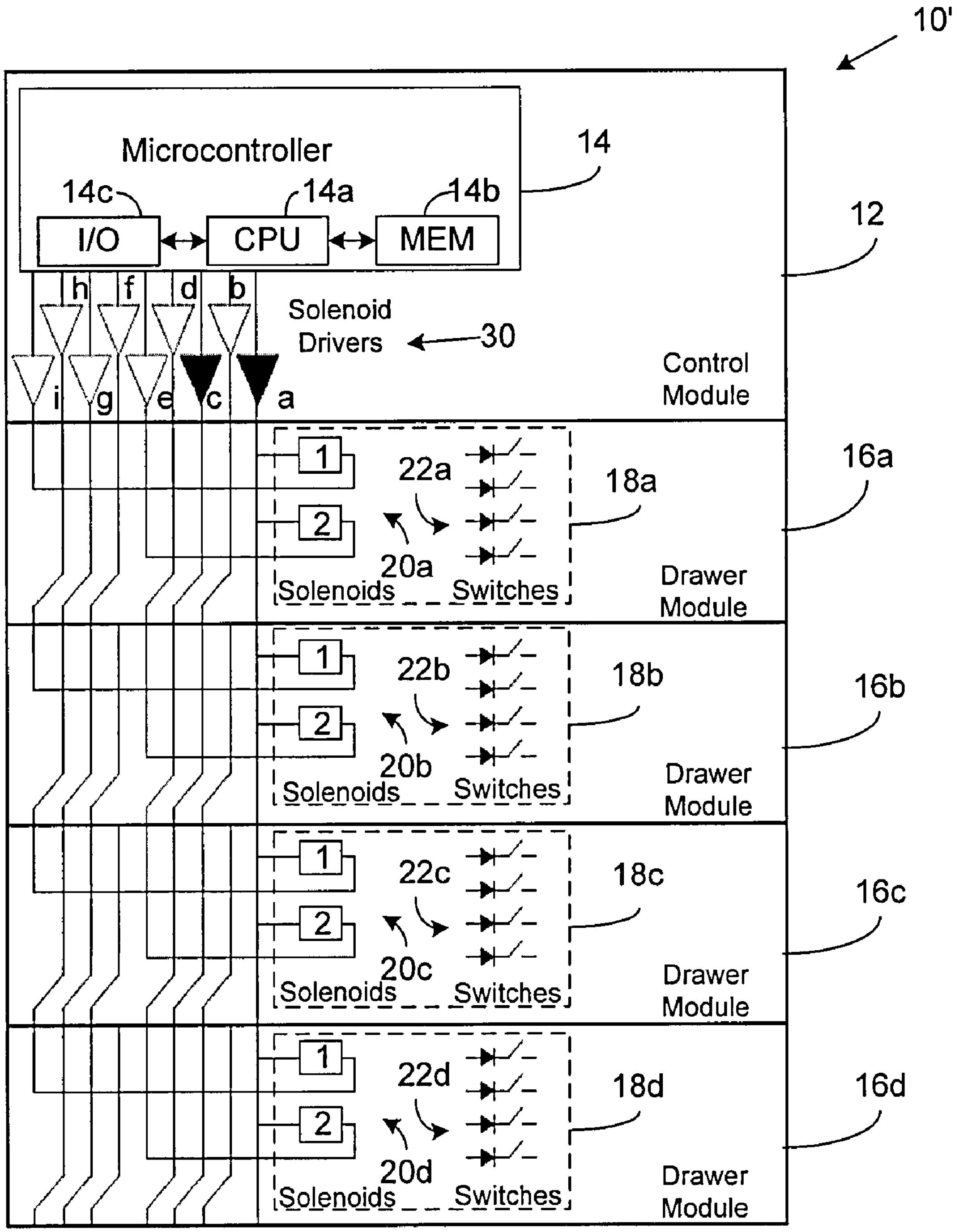
FIG. 2 is a schematic diagram of the drawer system of FIG. 1 and further including an exemplary driver circuit in accordance with the invention.

Moving now to FIG. 2, there is shown a drawer system 10' which is similar to the drawer system 10 of FIG. 1. The drawer system 10' includes all of the features of the drawer system 10. However, the control module 12' further includes an exemplary driver circuit 30 in accordance with the invention. The configuration of the driver circuit 30 and drawer modules 16*a*-16*n* enables identical drawer modules 16*a*-16*n* to be selectively controlled so as to grant or deny access to a particular drawer, without requiring specific setup or configuration of the drawers or drawer modules 16*a*-16*n*.

The driver circuit 30 includes a plurality of drivers 30*a*-30*n*, each of which can be driven high, low or turned off based on commands from the microcontroller 14. One driver 30*a* can be operatively coupled to one side of each actuator 20$a_i$-20$n_i$ of the drawer system 10'. The remaining drivers 30*b*-30*i* then are each operatively coupled to a single actuator, such that each actuator 20$a_i$-20$n_i$ is associated with two drivers. In this configuration, the two drivers corresponding to a single actuator can function as a full-bridge driver to apply voltage in either polarity to the actuator.

For example, if the actuators 20$a_i$-20$n_i$ are solenoids and it is desired to activate solenoid 20$c_2$, then the microcontroller 14 can command the drivers 30*a* and 30*c* of the driver circuit 30 to apply a voltage having a positive polarity to solenoid 20$c_2$ (i.e., where a positive polarity refers to providing a positive voltage to the left side of the solenoid). This can be accomplished, for example, by enabling drivers 30*a* (coupled to the left side of all solenoids) and 30*c* (coupled the right side of solenoid 20$c_2$), wherein driver 30*a* is set to apply a positive voltage and driver 30*c* is set to apply a negative voltage or zero volts (e.g. coupled to common).

If it is desired to reverse the polarity of the voltage applied to the solenoid (i.e., provide a negative voltage to the left side of the solenoid and a positive voltage to the right side of the solenoid), then the microcontroller 14 enables the same two driver circuits 30*a* and 30*c*, wherein driver 30*c* is set to apply a positive voltage and driver 30*a* is set to provide a negative voltage or zero volts. The solenoid 20$a_1$ may be de-energized by turning off at least one driver 30*a* and 30*c*.

As is evident from FIG. 2, the driver outputs are connected to the various actuators 20$a_i$-20$n_i$ in an interesting way. In the exemplary implementation of FIG. 2, a single common driver (i.e., driver 30*a*) drives one end of all solenoid coils. The other end of each solenoid coil is driven by a dedicated driver. The microcontroller 14 drives a particular solenoid coil by turning on the two drivers corresponding to the particular solenoid.

Further, it is noted that the top-most drawer module 16*a* picks off two driver outputs corresponding to the right side actuator connection (drivers 30*i* and 30*e*) and forwards the other driver outputs to the next drawer module so as to down shift or cascade them over one position. Thus, the second drawer module 16*b* in the stack picks off a different two driver outputs (drivers 30*h* and 30*d*) for the right side of its actuators 20$b_1$ and 20$b_2$ even though it is physically identical to the top drawer module 16*a*.

Figure 3:
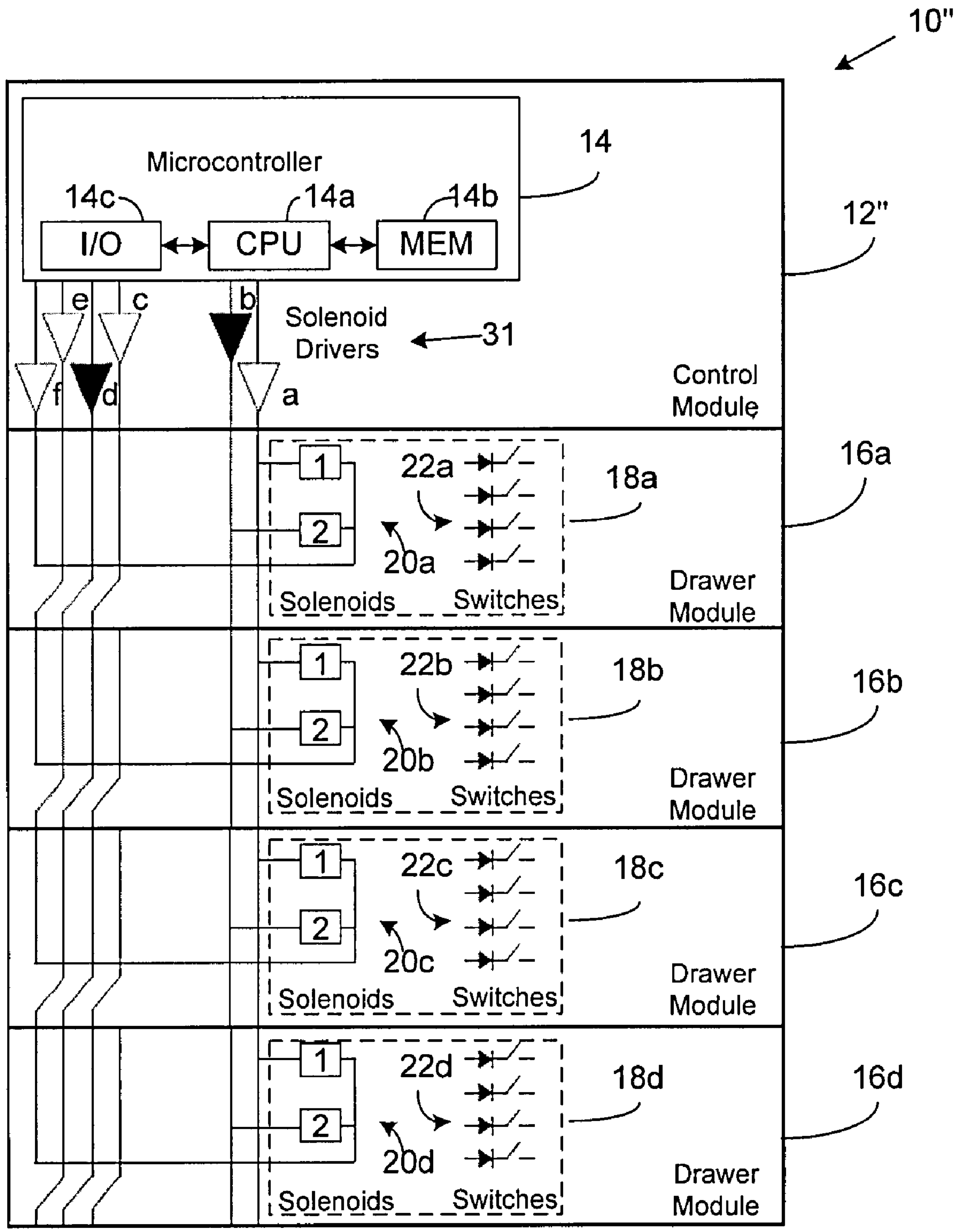
FIG. 3 is a schematic diagram of the drawer system of FIG. 1 and further including another exemplary driver circuit in accordance with the invention.

Other configurations of the driver circuit 30 are possible. For example, and with reference to FIG. 3, a driver circuit 31 could include a common left-end driver 31*a* for each of the upper actuators 20$a_1$, 20$b_1$, 20$c_1$ and 20$d_1$, and another common left-end driver 31*b* for each of the lower actuators 20$a_2$, 20$b_2$, 20$c_2$ and 20$d_2$. Then, only four cascading right-end driver outputs 31*c*-31*f* are needed for a four-drawer system as shown in FIG. 3.

As used herein, cascading the driver outputs is defined as using one (or more) of the drivers for a receiving drawer module (e.g., a first drawer module) and then shifting or staggering the remaining drivers of the first drawer module as they are passed to the next drawer module (e.g., the driver coupled to a first driver input of the first drawer module is used within the first drawer module, and the drivers coupled to second, third, fourth, etc. inputs of the first drawer module are provided to the next drawer module (e.g., second drawer module), wherein the second, third, fourth, etc. driver inputs of the first drawer module are coupled to first, second, third, etc. driver inputs, respectively, of the second drawer module).

For example, if the control module includes three drivers having terminals or connection points arranged sequentially (e.g., the connections from the control module are arranged as driver 1, driver 2 and driver 3 from left to right), and three drawer modules are to be stacked one on the other, then the three driver connections from the control module are all provided to a first drawer module as first, second and third driver inputs. The first drawer module uses the first driver input (driver 1 or a left-most driver connection) for its actuators, and passes the second and third driver inputs to the second drawer module (e.g., the next drawer module in the stack), wherein the second and third driver inputs of the first drawer module are coupled to the first and second driver inputs of the second drawer module. The second drawer module then uses the first driver input (originally driver connection 2 as provided to the first drawer module) for its actuators, and passes the second driver input connection (originally driver connection 3) to the third drawer module (again, the next drawer module in the stack). The second driver input provided to the second drawer module becomes the first driver input to the third drawer module.

Preferably, there is at least one common driver that is coupled to an actuator in a number of drawer modules. For example, in a three drawer system wherein each drawer has one actuator, one driver is coupled to a first connector of each actuator. Then, three additional drivers are coupled to second connectors, respectively, of each actuator (e.g., for three actuators, four drivers are used). In this manner, the signal polarity provided to each actuator may be reversed.

More drawers can be added to either system 10 and 10' of FIGS. 2 and 3 by adding more cascading right-side driver outputs. Other loads such as LEDs also can be added to the array of solenoid loads and selectively driven in the same way that the solenoid coils are driven.

Also, since the common driver and the particular driver form a full-bridge driver, the positive voltage applied to the solenoid coil does not have to be the same magnitude as the negative voltage. The microcontroller 14 can reduce the applied voltage by modulating the duty cycle of one of the two drivers using a technique such as pulse-width modulation. This is particularly useful with magnetically biased latching solenoids since such solenoids have different magnitude and opposite polarity pull-in and release voltages.

Figure 4:
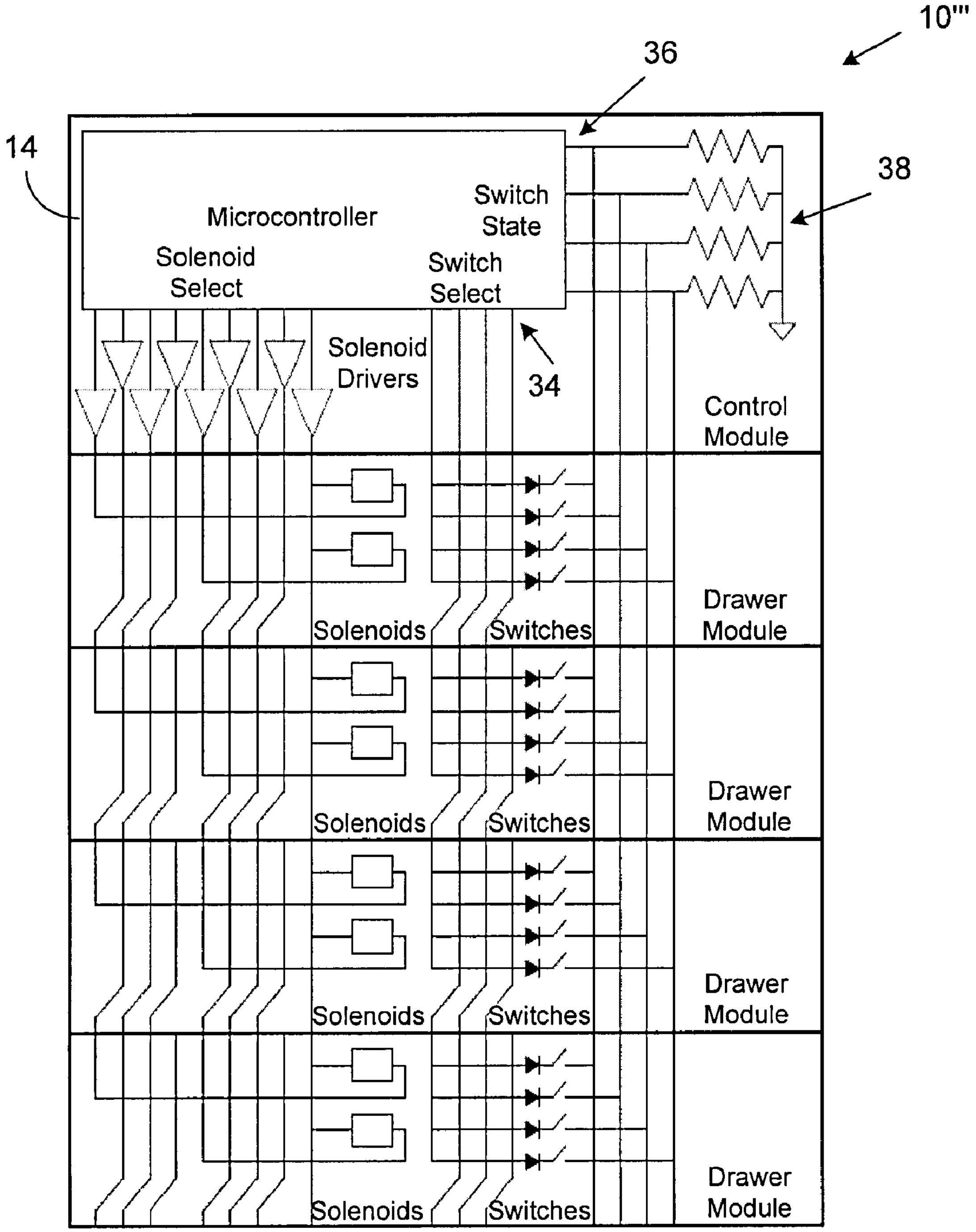
FIG. 4 is a schematic diagram of an exemplary drawer system with an exemplary switch pull-up circuit in accordance with the invention.

The switches 22$a_i$-22$n_i$, can be interrogated with a circuit very similar to the solenoid drive circuits 30 and 31. For example, and with reference to FIG. 4, a system 10''' that includes a plurality of pull-up drivers 34 can be connected in a cascaded fashion. Each driver pulls up on one end of each of the switches 22$a_i$-22$n_i$ in a particular drawer module. The other ends of the switches 22$a_i$-22$n_i$ can be connected to a plurality of common lines 36 that return to the microcontroller 14 where they are pulled down with resistors 38. The microcontroller 14 can interrogate the switches $22a_i$-$22n_i$ in a particular drawer module by turning on the corresponding pull-up driver. The microcontroller 14 then reads the common lines 36. A high logic level indicates a closed switch and a low logic level indicates an open switch.

Again, the microcontroller pull-up drivers 34 select the various drawer modules even though the drawer modules themselves are identical due to the cascaded connection of the pull-up driver outputs. Additional switches can be added to each drawer module by adding pulled-down common lines and one can add drawer modules by adding cascaded pull-up driver lines.

If one of the switches in the drawer module is replaced by a fixed connection, the drawer module's presence or absence can be determined by the microcontroller 14. If the connection is closed, the drawer module is present, but if the connection is open, the drawer module is absent. This feature allows the microcontroller 14 to determine how many drawers are stacked underneath it without user intervention. Other switches can be replaced by fixed connections to allow the microcontroller to differentiate between different types of drawer modules.

Accordingly, an apparatus that enables physically identical drawer modules to be selectively driven by a control module has been disclosed. Driver leads and switch pull-up driver leads allows the physically identical drawer modules to be selectively driven by the microcontroller in the control module. Moreover, the microcontroller can readily distinguish one drawer module from another drawer module with little or no setup. Further, the apparatus can reverse polarity of control signals provided to the actuators (e.g., solenoids, etc.) of the access module.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A system for selectively controlling access to a plurality of secure areas, comprising:

a plurality of actuators each operative to grant or deny access to a corresponding one of the plurality of secure areas;

a plurality of access modules each assigned to at least one secure area of the plurality of secure areas;

a driver circuit including a plurality of drivers for driving a load, wherein at least one of the plurality of drivers is operatively coupled to an actuator corresponding to an access module's secure area, and wherein unused drivers provided to a first access module of the plurality of access modules are output in a cascaded configuration to a second access module of the plurality of access modules.

2. The system according to claim 1, wherein each actuator of the plurality of actuators is operatively coupled to two drivers of the plurality of drivers.

3. The system according to claim 1, wherein a first driver of the plurality of drivers is operatively coupled to a first terminal of a plurality of actuators, and a second driver of the plurality of drivers is operatively coupled to a second terminal of only one actuator of the plurality of actuators.

4. The system according to claim 3, wherein the driver circuit is operative to reverse polarity of a signal provided to an actuator of the plurality of actuators.

5. The system according to claim 3, wherein at least one driver of the plurality of drivers is operative to be driven high, low or off.

6. The system according to claim 1, wherein a single driver of the plurality of drivers is operatively coupled to a first terminal of each of the plurality of actuators.

7. The system according to claim 6, wherein a single driver of the plurality of drivers is operatively coupled to a second terminal of one of the plurality of actuators.

8. The system according to claim 1, wherein the system is a medication dispensing unit.

9. The system according to claim 1, further comprising a control module operatively coupled to the driver circuit, said control module configured to operate the plurality of drivers so as to selectively control access to the plurality of secure areas.

10. The system according to claim 1, wherein at least one access module of the plurality of access modules is operative to detect a state of the corresponding secure area.

11. The system according to claim 10, wherein the possible states of the secure areas are open, closed, present or locked.

12. The system according to claim 1, further comprising a plurality of switches each corresponding to one of the plurality of secure areas, each switch operative to provide information corresponding to a state of the respective secure area.

13. The system according to claim 12, further comprising an input circuit operatively coupled to each of the plurality of access modules, said input circuit including i) a plurality of pull-up drivers operatively coupled to a first terminal of a switch of the plurality of switches, and ii) a common input for coupling to a second terminal of each of the plurality of switches, wherein each access module is configured such that unused pull-up drivers provided to a first access module of the plurality of access modules are cascaded to a second access module of the plurality of access modules.

14. The system according to claim 1, wherein the plurality of access modules are physically identical to one another.

15. The system according to claim 1, further comprising a plurality of locking mechanisms, wherein each of the plurality of locking mechanisms is operatively coupled to a corresponding one of the plurality of actuators.

16. A system for selectively controlling access to a plurality of secure areas, comprising:

a plurality of loads each corresponding to a state of access to a corresponding one of the plurality of secure areas;

a plurality of access modules each assigned to at least one secure area of the plurality of secure areas; and a driver circuit including a plurality of drivers, wherein at least one of the plurality of drivers is operatively coupled to an actuator corresponding to an access module's secure area, and wherein unused drivers provided to a first access module of the plurality of access modules are output in a cascaded configuration to a second access module of the plurality of access modules.

17. The system according to claim 16, wherein the load is an actuator or a status indicator.

18. The system according to claim 16, wherein a first driver of the plurality of drivers is operatively coupled to a first terminal of a plurality of loads, and a second driver of the plurality of drivers is operatively coupled to a second terminal of only one load of the plurality of loads.

19. An access module for use in a system for selectively controlling access to a plurality of secure areas, said system including a) a plurality of loads each corresponding to a state of access to a corresponding one of the plurality of secure areas, and b) a driver circuit including a plurality of drivers, wherein the access module corresponds to at least one secure area of the plurality of secure areas, the access module comprising:

a plurality of inputs configured to receive signals from the plurality of driver circuits;

a first plurality of outputs operatively coupled to at least some of the plurality of inputs, wherein the first plurality of outputs are configured to communicate the signals to actuators corresponding to the access module's secure area; and a second plurality of outputs operatively coupled to others of the plurality of inputs that are not coupled to the first plurality of outputs, wherein the second plurality of outputs provide a cascaded output of the others of the plurality of inputs.

* * * * *